United States Patent [19]

Stright

[11] Patent Number: 4,553,280

[45] Date of Patent: Nov. 19, 1985

[54] WATER HOSE FITTING TOOL

[76] Inventor: Ramon L. Stright, 8020 Rio Grande Blvd., NW., Albuquerque, N. Mex. 87114

[21] Appl. No.: 602,574

[22] Filed: Apr. 20, 1984

[51] Int. Cl.[4] .......................... B23G 5/20; B25F 1/00
[52] U.S. Cl. ............................................ 7/157; 7/169; 7/170; 408/22; 408/241 R; 29/402.02
[58] Field of Search .................. 7/169, 157, 170, 100; 408/215, 22, 221, 241 R; 10/1 B; 29/402.02, 402.15

[56] References Cited

U.S. PATENT DOCUMENTS

| | | |
|---|---|---|
| 1,118,732 | 11/1914 | Breedlove .......................... 408/221 |
| 1,296,279 | 3/1919 | Friebe .................................... 7/100 |
| 2,226,702 | 12/1940 | Berger et al. . |
| 3,422,469 | 1/1969 | Tunstall et al. . |
| 3,504,388 | 4/1970 | Tunstall et al. . |
| 4,213,216 | 7/1980 | Strybel . |
| 4,414,701 | 11/1983 | Johnson ............................ 29/402.02 |

*Primary Examiner*—Roscoe V. Parker
*Attorney, Agent, or Firm*—Henderson & Sturm

[57] ABSTRACT

An implement (10) for effecting repairs to a garden hose assembly (30) comprising a central hub element (16) having a plurality of arm elements (17) radially projecting therefrom and bearing a tap unit (12) a die unit (13), a removal unit (14) and an insertion unit (15), wherein the insertion (14) and removal (15) units may both be employed to refurbish the interior of both the male (32) and female (33) hose couplings.

1 Claim, 5 Drawing Figures

WATER HOSE FITTING TOOL

TECHNICAL FIELD

This invention relates generally to apparatus that may be employed to repair, replace or refurbish garden hose couplings.

BACKGROUND ART

Various attempts in the past have been made to develop implements that could be used to repair or replace specific structural components associated with both male and female hose couplings.

Unfortunately most of the prior art devices were primarily concerned with the removal and replacement of garden or air hose gasket fittings; since in most instances, under normal wear and tear, the gasket fitting would be the first and the most frequently replaced element in a coupling assembly. Examples of some of the aforementioned limited use prior art devices may be seen by reference to the following U.S. Pat. Nos.: 4,213,216; 2,226,702; 3,504,388 and 3,422,469.

Experience has proven however that both the male and female coupling structure surrounding the gasket are not immune from damage; and when either, or both, of these components are bent, crushed or otherwise deformed the hose will not function properly. Usually even the slightly deformation of either component results in the entire hose and coupling assembly being replaced, rather than repaired. The prime motivation behind this apparently wasteful behavior being that it is cheaper in the long run, since up until the present time there were no tools available to the average person that could be used to effect the necessary repairs.

DISCLOSURE OF INVENTION

The above stated problems are substantially resolved by the provision of the instant invention. The instant invention includes generally a main body unit, a tap unit, a die unit, a removal unit, and an insertion unit.

The body unit comprises a four pronged body element, wherein each of the spring arms supports one of the other tool units mentioned supra.

The tap unit comprises a male tap element, that is used to refurbish the threads in a female hose coupling.

The die unit comprises a female die element, this is used to refurbish the threads on a male hose coupling.

The removal unit comprises a curved hook element, that is used both to remove the hose gasket from the female coupling, and also to pry apart severely crimped portions of a coupling.

The insertion unit comprises a tapered insertion element, that is used both to insert and seat the replacement gasket, and also to return to round the interior of a hose coupling prior to the insertion of the tap unit or die unit to refurbish the threads.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
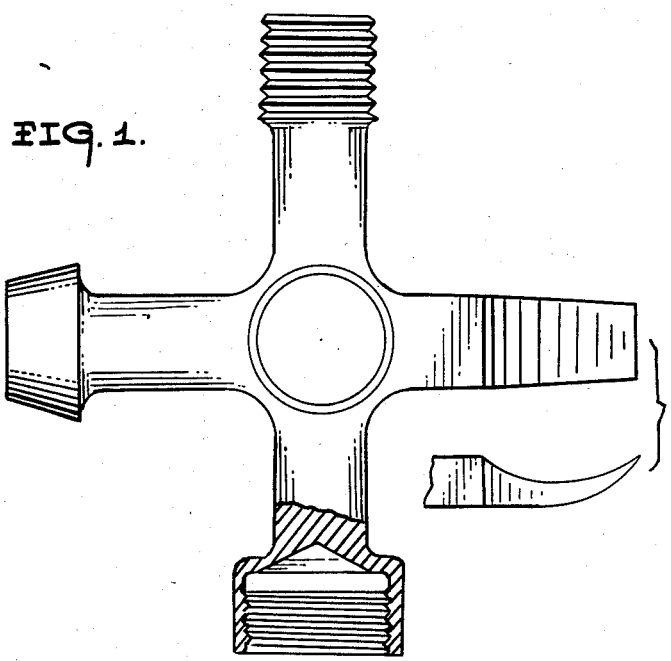
FIG. 1 is a front elevational view of the implement.
Figure 2:
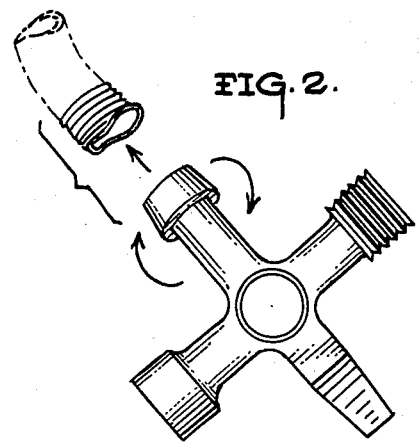
FIGS. 2 thru 5 illustrate how the various tools on the implement operate with respect to both a male and female hose coupling.

Referring now to the drawings, and in particular to FIG. 1, the implement may be seen as depicted generally by the numeral 10. The implement (10) includes generally a body unit (11), a tap unit (12), a die unit (13), a removal unit (14), and an insertion unit (15). Each of these units will now be described in seriatim fashion.

The body unit (11) comprises a central hub element (16) having a plurality are elements (17) projecting radially outwardly therefrom. Each of the are elements (17) is further provided with one of the following tool components: the tap unit (12); the die unit (13); the removal unit (14); and, the insertion unit (15).

In as much as the implement (10) will be required to impart substantial force to the hose coupling components; the body unit (11) and its associated tool components should be fabricated as an integral implement, and the material employed in the fabrication of the preferred embodiment should be a hard metal such as steel or the like.

Prior to describing tool components; it should be noted that the implement (10) is intended to effect repairs on the coupling structure normally associated with a garden hose assembly (30), or similar construction. As shown in FIGS. 2 thru 5, a standard garden hose (30) comprises a length of flexible hose (31) having a male coupling element (32) disposed on one end, and a female coupling element (33) disposed on its other end.

The male coupling element (32) comprises an exteriorly threaded cylindrical member (34); and the female coupling element (33) comprises an interiorly threaded cylindrical member (35). In addition, the female coupling element (33) is normally provided with a resilient gasket (36) on its interior, to form a seal between the male and female couplings in their assembled relationship.

Figure 3:
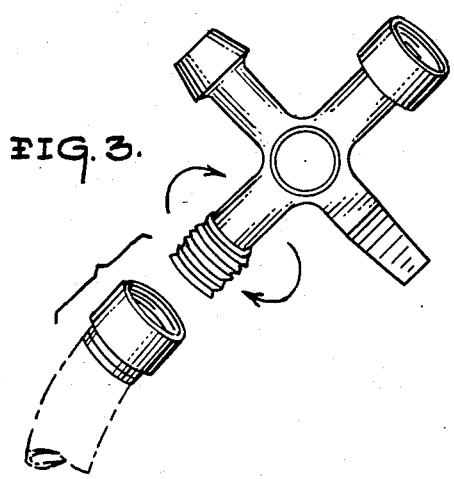
Figure 4:
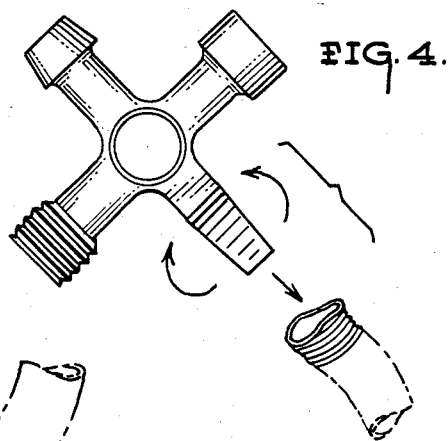

The top unit (12) comprises generally a tap member (18), having an exterior threaded surface (19) which is dimensioned to be complementary with the interior threads of the female coupling (33). As is best shown in FIG. 3, the tap member (18) threadly engages the female coupling element (33) to refurbish the interior threads therein.

Figure 5:
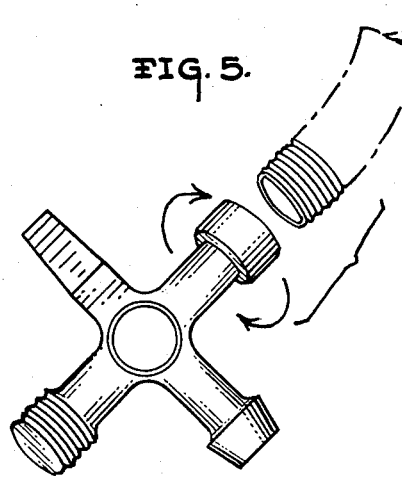

The die unit (13) comprises an enlarged hollow cylindrical die member (20) having an interior threaded surface (21), which is dimensioned to be complementary with the exterior threads of the male coupling element (32). As is best shown in FIG. 5, the die member (20) threadly engages the male coupling element (32) to refurbish the exterior threads formed thereon.

The removal unit (14) comprises a generally flattened tapered tang member (22) having an upturned hook portion (23) formed on its free end. As mentioned previously, the removal unit (14) serves a dual purpose; in as much as the hook portion (23) may be used to pry out a worn gasket (36) from the interior of the female coupling element (33); and the generally flat tang member may be inserted between severely crimped portions of either the male (32) or female (33) coupling elements, to restore them to their original cylindrical configuration.

The insertion unit (15) comprises in general an elongated tapered cylindrical member (24) that is dimensioned to be received within the cylindrical interiors of both the male (32) and female (33) coupling elements. The insertion unit (15) also performs a dual function; in that the tapered cylindrical member (24) may be used to insert, and seat, a replacement gasket (36) into the female coupling element (33) (see FIG. 3); and the sides of the tapered cylindrical member (24) may be used to return the interior of the male or female couplings "to round" prior to their respective threaded surfaces being refurbished by either the tap unit (12) or the die unit (13).

The operation of the implement (10) is illustrated in FIGS. 2 thru 5; and as heretofore described, both the insertion (15) and removal (14) units may be employed with either a male (32) or female (33) coupling element.

In the case of a severely crimped hose coupling component, the removal unit (14) is inserted into the reduced coupling opening (see FIG. 4) and rotated back and forth to enlarge the coupling opening, so that the opening will receive the insertion unit (15). The insertion unit (15) is then inserted into the coupling component and rotated to restore the original cylindrical configuration of the coupling component.

In the specific example of the repair a male coupling element (32), the final step in the repair process involves the threaded engagement of the die unit (13) with the threaded exterior of the male coupling (32), to refurbish the exterior threads.

In the specific example of the repair of a female coupling element (33), the final steps in the process involves; the removal of the gasket (36) using the hook portion (23) of the removal unit (14); the threaded engagement between the die unit (13) and the interior of the female coupline element (33) ro refurbish the interior threads; and the insertion of a replacement gasket (36) by the use of the insertion unit (15).

In as much as the effective use of the implement (10) may require that substantial torque forces be exerted between the implementn and the hose coupling structure, the hub element (16) of the body unit (11) may be provided with an enlarged central aperture (25), adapted to receive an elongated torque applying rod element (not shown).

Obviously, many modifications, substitutions and variations of the present invention are possible in light of the above teachings. It is therefore to be understood that, within the scope of the appended claims, the invention may be practiced otherwise than as specifically described.

What I claim is:

1. The combination of a water hose assembly and an implement for effecting repairs on the water hose assembly; wherein the water hose assembly comprises a length of flexible water hose having an exteriorly threaded male coupling disposed on one end, and an interiorly threaded female coupling disposed on the other end, wherein the frmale coupling is further provided with a riselient gasket disposed on an interior surface; and wherein said implement consists of:

a body unit comprising a hub element having a plurality of arm elements radially projecting therefrom, and having an enlarged central aperture formed therein which is dimensioned to receive an elongated torque applying means;

a tap unit comprising a tap member disposed on the end of one of said plurality of arm elements, and having an exterior threaded surface dimensioned to threadingly engage the interior threads of said female coupling;

a die unit disposed on the end of another of said plurality of arm elements, and comprising an enlarged hollow cylindrical die member having an interior threaded surface which is dimensioned to threadedly engage the exterior threads of said male coupling;

an insertion unit disposed on the end of still another of said plurality of arm elements, and comprising an elongated tapered cylindrical member, dimensioned to be received within the cylindrical interiors of the male and female couplings; and a removal unit disposed on the end of yet another of said plurality of arm elements, wherein said removal unit comprises a generally flattened tapered tang member having an upturned beveled hook portion formed on its free end, whereby the upturned hook portion is dimensioned and configured to engage and effect the removal of said resilient gasket from within the interior of said female hose coupling.

* * * * *